(12) United States Patent
Bolignano

(10) Patent No.: US 11,734,428 B2
(45) Date of Patent: Aug. 22, 2023

(54) SECURE EMBEDDED SYSTEM AND METHOD OF MAKING SECURE

(71) Applicant: PROVENRUN, Paris (FR)

(72) Inventor: Dominique Bolignano, Paris (FR)

(73) Assignee: PROVENRUN, Paris (FR)

(*) Notice: Subject to any disclaimer, the term of this patent is extended or adjusted under 35 U.S.C. 154(b) by 0 days.

(21) Appl. No.: 16/637,425

(22) PCT Filed: Aug. 7, 2018

(86) PCT No.: PCT/EP2018/071352
§ 371 (c)(1),
(2) Date: Feb. 7, 2020

(87) PCT Pub. No.: WO2019/030208
PCT Pub. Date: Feb. 14, 2019

(65) Prior Publication Data
US 2020/0226259 A1 Jul. 16, 2020

(30) Foreign Application Priority Data
Aug. 7, 2017 (FR) ...................................... 1770839

(51) Int. Cl.
G06F 21/57 (2013.01)
G06F 9/445 (2018.01)
(Continued)

(52) U.S. Cl.
CPC ........ *G06F 21/572* (2013.01); *G06F 9/44589* (2013.01); *G06F 21/126* (2013.01); *G06F 21/577* (2013.01); *G06F 21/629* (2013.01)

(58) Field of Classification Search
CPC .. G06F 21/572; G06F 9/44589; G06F 21/126; G06F 21/577; G06F 21/629;
(Continued)

(56) References Cited

U.S. PATENT DOCUMENTS

2007/0094673 A1* 4/2007 Hunt ..................... G06F 9/4411
719/321
2013/0055347 A1* 2/2013 Chawla ................... G06F 21/85
726/3

(Continued)

OTHER PUBLICATIONS

Bolignano, Proven Security for the Internet of Things, Jan. 1, 2016. (Year: 2016).*

(Continued)

*Primary Examiner* — Trong H Nguyen
(74) *Attorney, Agent, or Firm* — Seckel IP, PLLC

(57) ABSTRACT

The invention relates to an embedded system (1) comprising a processor (2) operated by means of a kernel (3) executable by said processor, a hardware peripheral (8, 9), a memory (5) and an application-related software program (6) recorded in said memory (5), said application-related software program (6) being executed by means of said kernel (3) executable by said processor (2), as well as a securing method. The invention is characterized in that the kernel (3) executable by said processor (2) controls said hardware peripheral (8, 9), obliges said application-related software program (6) to execute a policy, which is neither defined nor controlled by said program, for controlling access to said communication peripheral (8, 9), and is formally proven to satisfy at least one security property.

20 Claims, 2 Drawing Sheets

(51) Int. Cl.
*G06F 21/12* (2013.01)
*G06F 21/62* (2013.01)

(58) Field of Classification Search
CPC .... G06F 11/3604; G06F 8/65; G06F 11/3608; G06F 8/436
See application file for complete search history.

(56) References Cited

U.S. PATENT DOCUMENTS

2016/0224399 A1* 8/2016 Zheng ................. G06F 12/1027
2017/0206351 A1* 7/2017 Jay ....................... H04W 12/088
2018/0314845 A1* 11/2018 Anderson ............... G06F 21/32

OTHER PUBLICATIONS

International Search Report and Written Opinion dated Sep. 26, 2018 in counterpart application No. PCT/EP2018/071352; w/ English partial translation and machine translation (total 32 pages).

Bolignano, "Formally Proven and Certified Off-the-Shelf Software Components: the Critical Links for Securing the Internet of Things", in "Internet des Objets—Vous avez dit sécurité?" ["Internet of Things—Did you say security?"], C&ESAR 2016 Conference Computer & Electronics Security Applications, Rennes, France, Nov. 21-23, 2016, pp. 109-123, XP055471570, www.cesar-conference.org/wp-content/uploads/2017/06/Actes Cesar 2016.pdf (partially in English; with partial English machine translation) (total 41 pages).

Bolignano, "Proven Security for the Internet of Things", Embedded World Conference 2016, Jan. 1, 2016, pp. 1-11, XP055471559, www.provenrun.com/wp-content/uploads/2016/02/Proven-Security-for-the-Internet-of-Things-v2.pdf (in English).

Lescuyer, "ProvenCore: Towards a Verified Isolation Micro-Kernel", Prove & Run's document online, Jan. 1, 2015, pp. 1-8, XP055471557, ceec-project.org/wp-content/uploads/2015/01/Prove-Run-ProvenCore-Towardsa-Verified-Isolation-Micro-Kernel.pdf (in English).

\* cited by examiner

SECURE EMBEDDED SYSTEM AND METHOD OF MAKING SECURE

FIELD OF THE INVENTION

The present invention relates to an embedded system comprising a processor operated via a kernel executable by said processor, a memory, and an application software program recorded in said memory, said application software program being executable via said kernel executable by said processor. Moreover, it relates to a method for securing such a system.

PRIOR ART

The Internet of things (IoT) and, more generally, embedded systems play a role that is also important in the broad field of computer science. Cybersecurity has begun to appear in a plurality of fields of the IoT and, in particular, in the field of connected cars, intelligent networks, smart homes, smart offices, smart cities, avionics, adaptive maintenance, industry called 4.0. The problems of security will tend to grow at an even greater pace that the IoT itself, since professional crackers will also take advantage of more profitable business models coming from greater volumes, the greater value of the individual objects involved, other functionalities of the IoT, etc., to spread out to other fields of the IoT, for example, to the field of home health care, medical equipment, build to order, until rapidly becoming essential and essential for the successful deployment of the IoT.

Numerous cyberattacks have been signaled in the recent past. Even if these attacks were mainly aimed at motor vehicles and mobile telephones, most of them are rather general and could occur in almost all the fields of the IoT.

Although a part of the attacks can be prevented by applying the prior art in the field of security, it appears that a significant part of said attacks will persist because of the vulnerability of the several operating system inevitably present in the trusted bases of such embedded systems.

Various public databases provide statistics on pubic bugs or the vulnerabilities in all types of software. These databases clearly show that the operating systems and the current kernels suffer from a large number of errors and of weaknesses, even when they are developed by experienced teams and regardless of how long ago they were created. In particular, new errors are still signaled by the thousands every year on systems considered to be well mastered such as Linux™.

This situation is essentially due to the inherent complexity of these operating systems and kernels, which depend more and more on complex and sophisticated hardware. The operating systems and the kernels are by nature concurrent and extremely complex because of the need to support various types of peripherals. This involves namely interrupt management which is becoming more and more difficult, and performance goals such as, for example, the complexity of cache management, the problems of consumption of resources such as, for example, the need for a sophisticated management of the power supply, etc. This complexity increases with time, increases with the new architectures of the IoT and increases with regard to real microprocessors as opposed to microcontrollers.

The following documents are known Dominique Bolignano: "Formally Proven and Certified Off-The-Shelf Software Components: the Critical Links for Securing the Internet of Things", CESAR 2016 conference Computer & Electronics Security Applications Rendez-vous—Internet des Objets Vous avez dit sécurité?—21-23 Nov. 2016, Rennes, France, pages 1-4, XP055471570 and Dominique Bolignano: "Proven Security for the Internet of Things", Embedded World Conference 2016, 1 Jan. 2016 (2016-01-01), pages 1-11, XP055471559. These documents disclose formally proven kernels. These are for example the kernels ProvenCore™ or ProvenCore-M™. As disclosed in these documents, such kernels can be used to secure hardware peripherals in the IoT. However, these kernels do not control the application software programs with regard to access to the hardware peripherals. It is therefore still possible for the application software programs disclosed in these documents, which access said hardware peripherals, to be corrupted. Accesses intended to be unauthorized, by said application programs, to said hardware peripherals, may occur, and the access to said peripherals would therefore not be correctly secured.

SUMMARY OF THE INVENTION

Given the above, a problem that the invention proposes to solve is to provide an embedded system comprising a processor operated via a kernel executable by said processor, a memory, and an application software program recorded in said memory, said application software program being executable via said kernel executable by said processor, as well as a method for the securing of such a system, which overcomes the aforementioned disadvantages of the prior art, by proposing an improved securing of said systems.

The first object of the proposed solution of the invention to this posed problem is an embedded system comprising:
a processor operated via a kernel executable by said processor, said kernel being formally proven to satisfy at least one security property;
a hardware peripheral;
a memory; and
an application software program recorded in said memory, said application software program being executed via said kernel formally proven and executable by said processor, characterized in that the kernel, executable by said processor, controls said hardware peripheral, executes said application software program, and forces said application software program to execute a policy for controlling access to said hardware peripheral.

Its second object is a method for securing an embedded system comprising a processor operated via a kernel executable by said processor; a hardware peripheral; a memory; and an application software program recorded in said memory, said application software program being executed via said kernel executable by said processor, characterized in that the kernel executable by said processor controls said communication peripheral, forces said application software program to execute a policy for controlling access to said hardware peripheral and is formally proven to satisfy at least one security property.

Thus, by formally proving at least one kernel of the processor and by making it so that this kernel forces the application software program to execute the respect of a policy for controlling access to the communication peripheral, an increased securing of the system according to the invention is achieved. Even if the application software program is corrupted, given that the kernel, which is formally proven with regard to the control of access to the hardware peripheral, imposes on it the respect of a security policy relative to the access to the hardware peripheral, this access to said peripheral is thus secured. It will also be secured in the case in which there are a plurality of application software programs, the security policy thus being imposed on this plurality of application software programs.

Advantageously, —the access-control policy is not defined and is not controlled by said application software program; —said at least one security property is a policy for controlling access to said hardware peripheral; —the hardware peripheral is a communication peripheral; —the system comprises at least one additional application software program, and a policy for access to said hardware peripheral is imposed on said at least one additional application software program; —the kernel further imposes, on the application software program, a policy for access to said at least one additional application software program; —the kernel further imposes, on at least one additional application software program, a policy for access to the application software program; —the system comprises a plurality of additional application software programs, and an additional application software program is subjected to a policy for access to another additional application software program by the kernel; —the application software program, executed by the formally proven kernel, is formally proven to satisfy said at least one security property; —the formally proven kernel and/or the formally proven application software program satisfies a security requirement equal to or greater than the level EAL5; —the processor is operated by the formally proven kernel and by at least one additional kernel, said additional kernel not being formally proven, and the application software program is only executable by the formally proven kernel of the processor; —the communication peripheral is a peripheral for communication to a network and/or a smart object, and the application software program filters all the data and/or instructions transmitted and/or received from said network and/or smart object; —the system further comprises a peripheral for communication to a network of smart objects, and the application software program filters all the instructions and/or data transmitted and/or received from said network of smart objects; —the application software program filters the data and/or instructions transmitted by the smart object to the network of smart objects and/or transmitted by the network of smart objects to the connected object, with regard to the security property, as respecting this property; —said at least one security property is a policy for security relative to the integrity of the data and/or instructions, for privacy of the data, for controlling access to a hardware and/or software resource or for direction of circulation of the data and/or instructions; —said security policy is relative to the direction of circulation of the data and/or instructions and, according to this security policy, said data and/or instructions are only allowed to pass in a single direction of circulation; —the system comprises a peripheral for communication to a smart object and network of smart objects and the single direction of circulation is the direction going from the smart object to the network of smart objects.

BRIEF DESCRIPTION OF THE DRAWINGS

The invention will be better understood upon reading the following non-limiting description, drafted with regard to the appended drawings, in which.

DETAILED DESCRIPTION OF THE INVENTION

Figure 1:
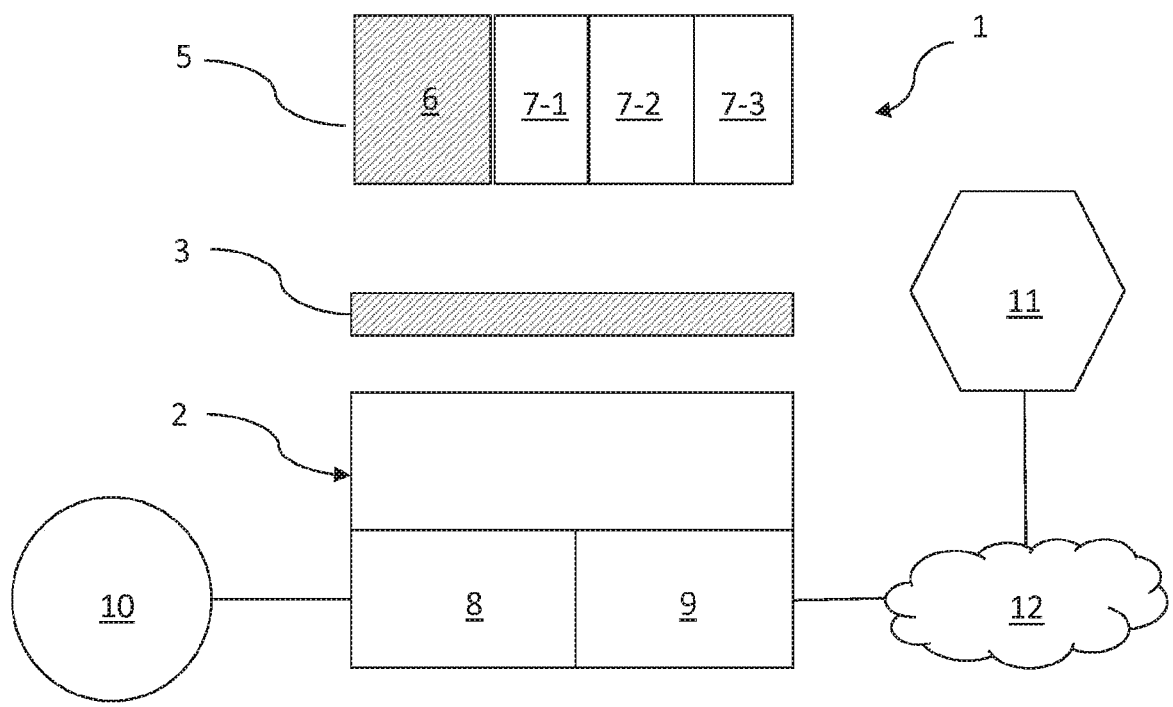
FIG. 1 is a diagram showing various means implemented in a system according to the invention.

The invention relates to an embedded system. Such a system is shown in FIG. 1. It is referenced as 1 in this drawing. It is a specialized autonomous computer system, often with a view to executing a very specific task, and comprising both hardware and software resources, said resources being generally at the very least limited in terms of space and in terms of energy consumption. Systems on chip (SoC, System on Chip) are embedded systems according to the invention.

The embedded system according to the invention comprises a processor 2. This processor is an electronic component present in the system according to the invention, which executes instructions of software programs. In general, this is a microprocessor. However, this can also be a microcontroller.

The processor according to the invention comprises at least one set of instructions, some of which are only accessible in certain privileged execution modes. A kernel or microkernel 3 is a program that uses these instructions in privileged mode to manage the—or some—resources of the machine for the applications 6, 7-1, 7-2, 7-3 that it allows to execute and which will not be executed in privileged mode but in a less privileged mode generally called the user mode. According to the invention, the kernel 3 executable by the processor 2 is formally proven to satisfy at least one security property. This means that it has been demonstrated by a formal method that the kernel 3 is secure with regard to the security property in question. Formally proven kernels are known from the prior art. Such kernels are for example disclosed in the documents D. Bolignano, "Proven Security for the Internet of things", Embedded World 2016, Nuremberg, Germany, Feb. 23-25, 2016 and S. Lescuyer, "Proven-Core: Towards a verified isolation micro-kernel", EuroMILS Workshop, 10th HiPEAC Conference, Amsterdam, Netherlands, Jan. 19-21, 2015. These are for example kernels satisfying the evaluation assurance level EAL5 or a greater level EAL6 or EAL7. The security property is in particular a policy for security relative to the integrity of the data and/or instructions, for privacy of the data, for controlling access to a hardware resource, for example a hardware peripheral, namely a communication peripheral and/or to a software resource, for example an application software program, or for direction of circulation of the data and/or instructions. In a specific example, this is a security policy relative to the direction of circulation of the data and/or instructions. The security properties for which the kernel is formally proven, for example, the security policies, are properties called high-level, which can be refined in various mechanisms of a lower level. In practice, it is these mechanisms of a lower level that are formally proven as being secure. For this purpose, these low-level mechanisms have been symbolically tested in all the possible situations. It is shown, mathematically, that they satisfy the security requirements, in all the situations in which they can be implemented.

The system according to the invention further comprises a memory 5. This memory is an electronic device allowing to store information, for example data and/or application software programs.

Moreover, the system according to the invention comprises at least one application software program 6. It further comprises optionally at least one and, in general, a plurality of other additional application software programs 7-1, 7-2, 7-3. The application software program 6 is recorded in the memory 5. It is executable via the kernel 3 of the processor 2. According to the invention, the application software program 6 is advantageously formally proven to satisfy the security property that is the object of the formal proof of the kernel 3 of the processor 2.

Finally, the system according to the invention comprises various additional components of a software nature or of a hardware nature.

These are hardware peripherals such as sensors, peripherals for controlling, for example, an action or a motor, or such as communication hardware peripherals 8, 9. These communication peripherals are for example Ethernet™ communication peripherals.

These are also software components such as additional application software programs, namely driver software 7-3 in particular of the communication peripherals 8, 9, application software programs allowing the creation of private virtual networks 7-1 such as OpenVPN™, software layers such as for example a layer for transporting security information (TLS, Transport Layer Security), an application software program ensuring the communication with the outside world according to the protocol TCP/IP 7-2. This can also be a peripheral driver, since in the case of a microkernel this can run in user mode, that is to say as applications.

In practice, the system 1 according to the invention is an embedded system that comprises or is connected to one or more smart objects, or to a smart network potentially composed of servers. These are objects included in said system 2 or directly connected to the latter or these are objects connected to the system through a network for example an IoT network. In the example of FIG. 1, the communication peripheral 8 is directly connected to a smart object 10 and the communication peripheral 9 is connected to a network of smart objects 11 through the Internet 12, said network being provided with a trusted server. In such a case, the network of smart objects 11 is considered to form the world outside the system and the smart object 10 is part of the world inside said system.

According to the invention, the kernel 3 controls the or said communication peripherals 8, 9. For this purpose, it forces the application software program 6 to execute a policy of controlling access to said communication peripherals 8, 9. In practice, the formally proven kernel executes the instructions of the application software program and verifies that the execution of this application software program does not go against, or complies with, the policy for controlling access to the hardware peripherals. Of course, the policy for controlling access to the communication peripherals 8, 9, imposed by the kernel 3 onto the application software program 6 is not defined and is not controlled by said application software program 6. Indeed, a control of the policy for controlling access and, a fortiori, a definition of this access policy, by the application software program would impose including this program in the trusted base, namely the minimal set that must be certified and formally proven, which is sought to be avoided according to the invention. If the application software program is corrupted and, for example, this corruption has the consequence that said application software program could access the hardware peripherals, the formally proven kernel can, during the execution of this program, verify that all the accesses to the hardware peripherals are licit as being compliant with the policy for controlling access to said peripherals. If an illicit access is requested by the application, then the kernel detects that this access is illicit since it is not compliant with the desired security policy, and prohibits the application from accessing said peripheral. When the embedded system according to the invention comprises at least one additional application software program 7-1, 7-2, 7-3, the formally proven kernel 3 imposes a policy of controlling access to said at least one additional application software program 7-1, 7-2, 7-3 and for controlling access to said communication peripheral 8, 9 by said at least one additional application program 7-1, 7-2 7-3. It further imposes, on the application software program 6, a policy for access to said at least one additional application software program 7-1, 7-2, 7-3. When the system according to the invention comprises a plurality of additional application software program 7-1, 7-2, 7-3, an additional application software program 7-1, 7-2, 7-3 is subjected to a policy for access to another additional application software program 7-1, 7-2, 7-3, by the kernel 3. The policies for controlling access imposed on the various application software programs 6, 7-1, 7-2, 7-3 can be identical or different. When the same policy for controlling access is imposed on at least two applications, it can allow access to a peripheral to one of said at least two applications, and refuse access to this same peripheral to another of said at least two applications. Such policies for controlling access are generally configurable to allow said kernel to be used in various different configurations. They are generally configured statically for the system but can be in certain cases modified dynamically. The policy for controlling access can be considered in various ways:

For example as a square matrix between the various applications and peripherals and potentially the second OS if it exists on one side (that is to say the abscissae) and the same applications and peripherals on the other and the second OS if it exists (that is to say the ordinates) and indicating that which is allowed and authorized (by the kernel) in terms of access/communication between each of the abscissae and ordinates).

Or in an equivalent manner as a box of this matrix, in which case this gives a set of access-control policies (representing in a different manner the preceding matrix).

This (or these) access-control policy (policies) can potentially be parametered or configured. It allows or prohibits the communications between the application software programs and/or between said application software programs and/or the peripherals.

According to the invention, the formally proven kernel 3 of the processor 2 executes the application software program. Advantageously, the application software program is only executable by the formally proven kernel 3 of the processor 2. The kernel is the only one to execute the application.

Thus, this leads to greater securing of the system according to the invention. It is not necessary to formally prove the entirety of the kernel, or of the application program. Indeed the proof must be used on the parts of the system that without the proof would not allow to reach a level of quality potentially only leaving several residual bugs or errors (the number of residual bugs in the kernel must be close to or better than that of the residual bugs in the processor. In the case of a kernel, given the complexity of the hardware and of the software algorithms used the quasi-totality of the kernel must be proved, maybe with the exception of several sequential parts like the "boot" mechanisms (launch of the kernel), or several parts encapsulating the hardware and using simple and typically sequential algorithms. For an application program the portion of that which must be proved can be much more marginal, or even null in the cases in which the logic of the program can be brought to very a level of quality (number of residual bugs or errors extremely low, or even zero).

In a first example of implementation of the system according to the invention, it is desired to filter communications between the smart object 10 and the IoT 11 to be certain that the incoming and outgoing communications of the system, between said object and the IoT, each respect specific security policies. For example, it is accepted that only certain very specific commands coming from the outside and, more particularly, from the trusted server contained in the IoT and only certain data is allowed to exit towards the outside. It is desired for example to send information from embedded sensors such as the object 10 to data servers of the IoT, while preserving the possibility of sending certain commands to the embedded system such as configuration commands or requests for information. This example is thus an example in which the system according to the invention forms a filter.

In a second example of implementation of the system according to the invention, the filter is a specific filter, the operation of which is of the diode type, that is to say a filter that only lets the information pass in a single direction and does not control the information that passes in the other direction or authorized direction. Thus, such a system does not verify what type of data circulates in the authorized direction. Such systems or services are generally called "diodes", in reference to the electronic components of the same name. Such filters of the diode type are found for example on airplanes to send, during the flight, data from sensors located on the engines to trusted servers located on the ground. Given the architecture of the system according to the invention, such diodes can be constructed by developing applications and by configuring the Linux™ environment in such a way that the communication is only possible in one direction, namely the direction authorized by the diode. The problem is that a poor configuration and especially errors in the Linux™ kernel or in the manner in which the very complex set is configured can be used by an attacker to create undesired channels by circumventing for example the filter applications, or even by corrupting the integrity of all or a part of the system itself.

Figure 2:
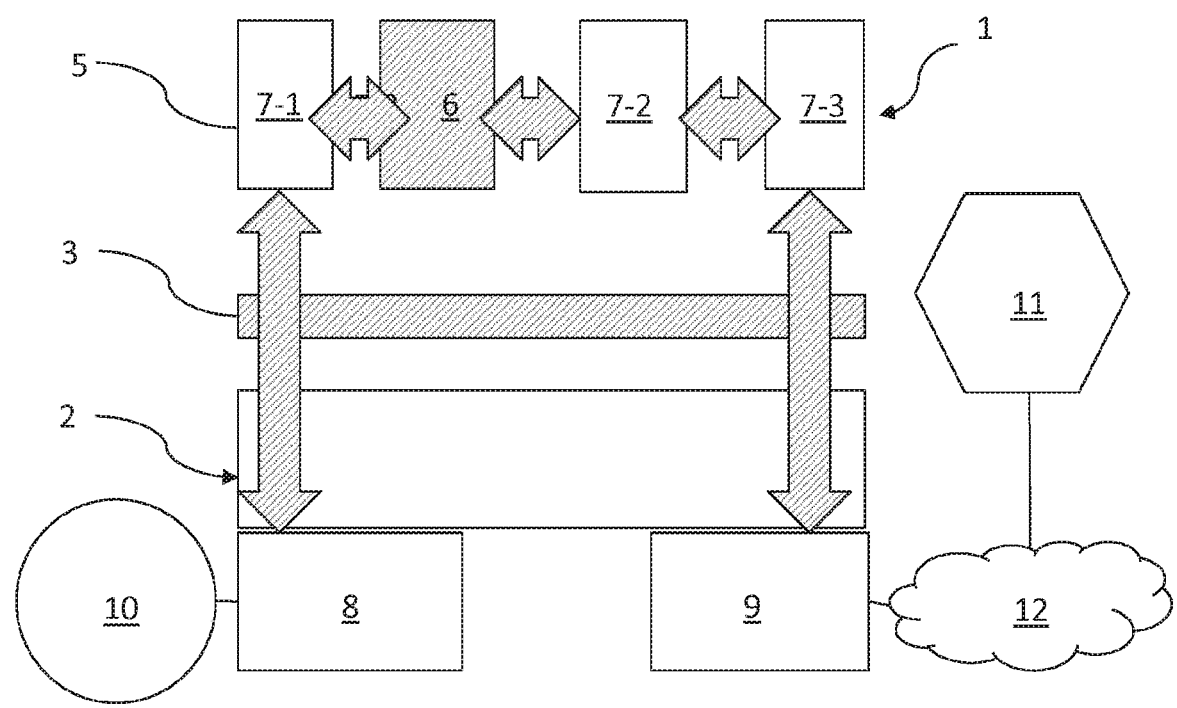
FIG. 2 is a diagram showing the interactions between the various means shown in FIG. 1.

According to the aforementioned first example, and in reference to FIG. 2, to provide a filter with a high level of resistance to remote attacks the invention proposes, for example, a system according to the invention in which the flows of information verified and authorized by the proven kernel are shown by double-arrows, the contents of which are cross-hatched. To evaluate the level of resistance to logical attacks the theoretical cost for putting in place a remote attack is estimated. For an operating system or a kernel managing the resources of a modern microprocessor, typically a Cortex A™ developed by ARM™, obtaining a resistance of the same level as the hardware generally requires the formal proof that the kernel verifies certain high-level properties, for example a separation between spaces. For an application based on such an operating system, the formal proof is not necessarily required when the application remains simple since known validation techniques can suffice: exhaustive tests, code rereading, etc. According to the invention, a kernel is used which, in addition to being formally proven, for properties such as the separation, can be configured to rigorously control the flows of information between its various applications. It is noted that the formally proven kernel is a microkernel here. The application driver software for hardware is compliant with that which has been defined just like with regard to the flows of information between its applications and the peripherals. In this example, the kernel guarantees, with a very high level of resistance, that only the Ethernet™ driver application 7-3 can communicate with the Ethernet™ peripheral 9, that the TCP/IP application 7-2, which implements the stack of the same name can only communicate with the Ethernet™ driver application 7-3, and the filter application 6 and the VPN application 7-2, that the Ethernet™ driver application 7-1 is the only one to be able to communicate with the Ethernet™ peripheral 8, and moreover can only communicate with the filter application 6. These controls are imposed by the OS or the kernel on the communications that represent the communications authorized by the OS between the various applications and the various communication peripherals. Other communication channels may not be controlled directly by the kernel. The architecture is simplified here: the filter application 6, which must be sufficiently simple to be brought to a very high level of resistance typically does not communicate directly with the communication driver, since this would tend to uselessly increase its complexity, but through other applications, and software stacks not necessarily offering the same level of resistance. Typically, protocol layers would be added, which makes it so that the system implements a protocol break that allows it to filter the abstract data of a high level. Typically a VPN would be used to protect the outside data and all or a part of the VPN agent could run and be protected and controlled by the proven kernel. The filter application 6 with its underlying kernel 3 ultimately allows to reduce the operation of the underlying equipment (by nature non-specialized) to a much more limited operation. To go from the world called inside to the outside world, the information must pass and be accepted by the filter application 6 placed on its formally resistant kernel 3, regardless of the quality of the other software stacks 7-1, 7-2, 7-3. Here, the communications between the outside and the inside—the outside world can only communicate with the subsystem of interest through the Ethernet™ peripheral 9, whereas the inside world can only communicate with the subsystem of interest through the Ethernet™ peripheral 8.

According to the prior art, to obtain a diode with high resistance, and thus certifiable at a very high level a physical diode is generally used. A physical diode uses by definition a dissymmetrical physical phenomenon as an example a laser beam that is used in a step of sending the information and structurally can only send the information in one direction.

The alternative according to the aforementioned second example according to the invention is a software diode which, functionally, is equivalent. Via the invention such a software diode can reach the same level of resistance as a physical diode, and can in particular be evaluated at the highest level of the security certification schemas, in particular the ISO standard of Common Criteria. Indeed, it is not possible, via a system according to the invention, having a filter application of the diode type, to exploit a vulnerability in the underlying OS to for example reprogram a function or bypass the application to allow communication in the other direction.

The solution proposed according to this second example is finally based on the architecture described above in which the filter application is replaced by an application that only lets the information pass in one direction. Such an application can be written very simply on the condition that the underlying OS provides high-level services that abstract the complexity of the equipment. It must also be possible to guarantee that this application cannot be circumvented and that the integrity of the OS cannot be affected. The access-control policy imposed by the kernel is thus essential here.

For the same reasons as for the software filter, the architecture proposed allows this and the software diode according to the invention potentially allows to offer a level of resistance of a level comparable to a hardware diode while offering features of great interest: use of generic components (the core of the system can use a generic microprocessor), and possible evolution of the functionalities (it is possible for example by providing such an architecture with a system for updating the microprogram (Firmware Update) with a high level of resistance to add functionalities, update them, etc., or even, in these examples go from the diode to the filter or vice versa, etc. It is also possible to very quickly certify such an architecture at the highest level of security by relying on the certifications or precertifications of the heaviest components, for example the operating system. For obvious reasons the same level could potentially be obtained for the filter of the first example even though this is currently considered to be out of reach given the economic constraints.

Of course, the examples of the filter and of the diode are only specific examples according to the invention. It is indeed possible to limit the operation of systems corresponding to the object of the invention in very many other ways, including dynamically during the life of the system. In other examples, it is possible to filter or finely control certain peripherals, or to prohibit certain flows between peripherals.

The invention claimed is:

1. An embedded system comprising:
    a processor operated via a kernel executable by the processor, the kernel being formally proven to satisfy at least one security property;
    a hardware peripheral;
    a memory; and
    an application software program recorded in the memory, the application software program being executed via the formally proven kernel, the application software program being not formally proven or not entirely formally proven, and
    wherein the formally proven kernel, executes the application software program, and forces the application software program to execute a policy of controlling access to the hardware peripheral, wherein the formally proven kernel verifies that execution of the application software program does not go against, or complies with, the policy for controlling access to the hardware peripheral,
    wherein the formally proven kernel imposes on the application software program the policy for controlling access to the hardware peripheral,
    wherein the at least one security property is a policy
        for security relative to integrity of data and/or instructions transmitted to and/or from the hardware peripheral,
        for privacy of data transmitted to and/or from the hardware peripheral,
        for controlling access to the hardware peripheral by the application software program and/or by at least one additional application software program, and/or
        for direction of circulation of data and/or instructions transmitted to and/or from the hardware peripheral.

2. The system according to claim 1, wherein the policy of controlling access is not defined and is not controlled by the application software program.

3. The system according to claim 1, wherein the at least one security property is a policy for controlling access to the hardware peripheral.

4. The system according to claim 1, wherein the hardware peripheral is a communication peripheral.

5. The system according to claim 4, wherein the system comprises at least one additional application software program, and wherein a policy for access to the hardware peripheral is imposed on the at least one additional application software program.

6. The system according to claim 5, wherein the kernel further imposes, on the application software program, a policy for access to the at least one additional application software program.

7. The system according to claim 5, wherein the kernel further imposes, on at least one additional application software program, a policy for access to the application software program.

8. The system according to claim 5, wherein the system comprises a plurality of additional application software programs, and wherein an additional application software program is subjected to a policy for access to another additional application software program, by the kernel.

9. The system according to claim 4, wherein the communication peripheral is a peripheral for communication to a network and/or a smart object, and wherein the application software program filters all data and/or instructions transmitted and/or received from the network and/or the smart object.

10. The system according to claim 9,
    wherein the system further comprises a peripheral for communication to a network of smart objects, and wherein the application software program filters all instructions and/or data transmitted and/or received from the network of smart objects,
    wherein the application software program filters data and/or instructions
        transmitted by the smart object to the network of smart objects, wherein the formally proven kernel satisfies a security requirement equal to or greater than evaluation assurance level EAL5, wherein the processor is operated by the formally proven kernel and by at least one first additional kernel, the first additional kernel not being formally proven, and the application software program is only executable by the formally proven kernel of the processor, and/or
        transmitted by the network of smart objects to the smart object, wherein the processor is operated by the formally proven kernel and by at least one second additional kernel, the second additional kernel not being formally proven, and the application software program is only executable by the formally proven kernel of the processor, wherein the formally proven kernel satisfies a security requirement equal to or greater than evaluation assurance level EAL5,
    with regard to the at least one security property, as respecting the at least one security property.

11. The system according to claim 4, wherein the system further comprises a peripheral for communication to a network of smart objects, and wherein the application software program filters all instructions and/or data transmitted and/or received from the network of smart objects.

12. The system according to claim 1, wherein an application software program, executed by the formally proven kernel, is formally proven to satisfy the at least one security property.

13. The system according to claim 1, wherein the formally proven kernel satisfies a security requirement equal to or greater than evaluation assurance level EAL5.

14. The system according to claim 1, wherein the processor is operated by the formally proven kernel and by at least one additional kernel, the additional kernel not being formally proven, and the application software program is only executable by the formally proven kernel of the processor.

15. The system according to claim 1, wherein the at least one security property is a policy
for security relative to integrity of data and/or instructions, and/or
for privacy of data.

16. The system according to claim 15, wherein the security policy is relative to a direction of circulation of data and/or instructions and wherein, according to the policy related to the at least one security property, data and/or instructions are only allowed to pass in a single direction of circulation.

17. The system according to claim 16, wherein the system further comprises a peripheral for communication to a smart object, wherein the processor is operated by the formally proven kernel and by at least one additional kernel, the additional kernel not being formally proven, and the application software program is only executable by the formally proven kernel of the processor, and a network of smart objects, wherein the communication peripheral is a peripheral for communication to the network of smart objects, and wherein the application software program filters all data and/or instructions transmitted and/or received from the network of smart objects, and wherein the single direction of circulation is a direction going from the smart object to the network of smart objects.

18. A method for securing an embedded system comprising:
a processor operated via a formally proven kernel executable by the processor;
a hardware peripheral which is a communication peripheral;
a memory; and
an application software program recorded in the memory, the application software program being not formally proven or not entirely formally proven, the method comprising:
executing the application software program via the formally proven kernel executable by the processor, wherein the formally proven kernel executable by the processor controls the communication peripheral, forces the application software program to execute a policy for controlling access to the hardware peripheral and is formally proven to satisfy at least one security property, wherein the formally proven kernel verifies that execution of the application software program does not go against, or complies with, the policy for controlling access to the hardware peripheral,
wherein the formally proven kernel imposes on the application software program the policy for controlling access to the hardware peripherals,
wherein the at least one security property is a policy
for security relative to integrity of data and/or instructions transmitted to and/or from the hardware peripheral,
for privacy of data transmitted to and/or from the hardware peripheral,
for controlling access to the hardware peripheral by the application software program and/or by at least one additional application software program, and/or
for direction of circulation of data and/or instructions transmitted to and/or from the hardware peripheral.

19. The method according to claim 18, wherein the policy of controlling access is not defined and is not controlled by the application software program.

20. The method according to claim 19, wherein the at least one security property is a policy for controlling access to the hardware peripheral.

* * * * *